US010504150B2

(12) United States Patent
Li et al.

(10) Patent No.: US 10,504,150 B2
(45) Date of Patent: *Dec. 10, 2019

(54) LOCATION RETARGETING SYSTEM FOR ONLINE ADVERTISING

(71) Applicant: Oath Inc., New York, NY (US)

(72) Inventors: Wentong Li, Saratoga, CA (US); Yi Mao, Sunnyvale, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,767

(22) Filed: Jan. 28, 2019

(65) Prior Publication Data

US 2019/0156368 A1    May 23, 2019

Related U.S. Application Data

(63) Continuation of application No. 13/951,091, filed on Jul. 25, 2013, now Pat. No. 10,192,241.

(60) Provisional application No. 61/676,895, filed on Jul. 28, 2012.

(51) Int. Cl.
   *G06Q 30/00*   (2012.01)
   *G06Q 30/02*   (2012.01)

(52) U.S. Cl.
   CPC ..... *G06Q 30/0261* (2013.01); *G06Q 30/0266* (2013.01); *G06Q 30/0267* (2013.01)

(58) Field of Classification Search
   CPC ........... G06Q 30/0261; G06Q 30/0266; G06Q 30/0267
   USPC .............................. 705/14.49, 14.58, 14.64
   See application file for complete search history.

(56) References Cited

U.S. PATENT DOCUMENTS

| | | | | |
|---|---|---|---|---|
| 7,496,191 B1* | 2/2009 | Crews | ................. | G06F 21/6218 379/142.02 |
| 7,853,786 B1* | 12/2010 | Fultz | .................... | H04L 63/102 713/166 |
| 7,873,534 B2* | 1/2011 | Simons | .............. | G06Q 30/0201 705/7.29 |
| 8,326,767 B1* | 12/2012 | Ramanujan | ......... | H04L 67/2809 705/78 |
| 8,332,535 B2* | 12/2012 | Dingler | .................. | H04L 67/18 709/238 |
| 8,428,867 B2* | 4/2013 | Ashley, Jr. | ............ | G01S 5/0045 342/357.25 |

(Continued)

*Primary Examiner* — Luis A Brown
(74) *Attorney, Agent, or Firm* — Cooper Legal Group, LLC

(57) ABSTRACT

A system for retargeting customers is based on a mobile device query initiated by a user, and includes a query module configured to receive a query with geographical information from the mobile device and determine geographical identifiers of the mobile device. An indexed database stores an aggregated plurality of customers having a geographical identifier proximate to the determined geographical area, and a processor selects an advertiser located proximate to the determined geographical area. A performance feedback module is configured to assign an effectiveness rating to one or more advertisements provided by the selected advertiser based on marketing attributes of the aggregated plurality of customers. An advertisement recommendation module then recommends one or more advertisements provided by the selected advertiser based on the assigned effectiveness rating, and the aggregated plurality of customers are retargeted by transmitting the recommended advertisements to one or more customers of the aggregated plurality of customers.

18 Claims, 7 Drawing Sheets

(56) References Cited

U.S. PATENT DOCUMENTS

| | | | | |
|---|---|---|---|---|
| 2002/0099600 A1* | 7/2002 | Merriman | | G06Q 30/02 705/14.52 |
| 2005/0015307 A1* | 1/2005 | Simpson | | G06Q 30/02 705/26.61 |
| 2006/0022048 A1* | 2/2006 | Johnson | | H04W 4/029 235/462.1 |
| 2006/0212299 A1* | 9/2006 | Law | | G06Q 10/00 715/748 |
| 2007/0162341 A1* | 7/2007 | McConnell | | G06Q 30/02 705/14.38 |
| 2008/0052276 A1* | 2/2008 | Tzamaloukas | | G06F 16/90 |
| 2008/0059424 A1* | 3/2008 | Tzamaloukas | | G06F 16/9537 |
| 2008/0097834 A1* | 4/2008 | McElfresh | | G06Q 30/02 705/7.29 |
| 2009/0031006 A1* | 1/2009 | Johnson | | G06F 16/972 709/218 |
| 2009/0216642 A1* | 8/2009 | Ho | | G06Q 30/02 705/14.25 |
| 2010/0161378 A1* | 6/2010 | Josifovski | | G06Q 30/0243 705/14.42 |
| 2010/0205213 A1* | 8/2010 | Broder | | G06F 16/24539 707/780 |
| 2010/0205628 A1* | 8/2010 | Davis | | H04M 1/72533 725/25 |
| 2011/0231233 A1* | 9/2011 | Iannace | | G06Q 30/02 705/14.13 |
| 2012/0036034 A1* | 2/2012 | Golden | | H04W 4/021 705/26.3 |
| 2012/0179549 A1* | 7/2012 | Sigmund | | G06Q 30/0261 705/14.58 |
| 2012/0278171 A1* | 11/2012 | Tang | | G06F 16/9537 705/14.57 |
| 2012/0290389 A1* | 11/2012 | Greenough | | G06Q 30/0261 705/14.53 |
| 2013/0053057 A1* | 2/2013 | Cansino | | G06Q 30/0261 455/456.1 |
| 2013/0060633 A1* | 3/2013 | St-Pierre | | G06Q 30/0251 705/14.58 |
| 2013/0090130 A1* | 4/2013 | Burrell | | H04W 64/00 455/456.1 |
| 2013/0091016 A1* | 4/2013 | Shutter | | G06O 30/02 705/14.58 |
| 2013/0132993 A1* | 5/2013 | Huchital | | H04H 60/375 725/22 |
| 2013/0138508 A1* | 5/2013 | Gee | | H04W 4/21 705/14.58 |
| 2013/0144717 A1* | 6/2013 | Williams | | G06Q 30/0251 705/14.53 |
| 2013/0290643 A1* | 10/2013 | Lim | | G06F 16/24552 711/144 |

* cited by examiner

| Advertiser 302 | Address 306 | Zip Code 310 | Zip Code + 4 314 | Purchase categories 320 | Recommend categories 324 |
|---|---|---|---|---|---|
|  |  |  |  |  |  |
|  |  |  |  |  |  |
|  |  |  |  |  |  |

FIGURE 3. Offline CRM Data Sample Prior to Processing

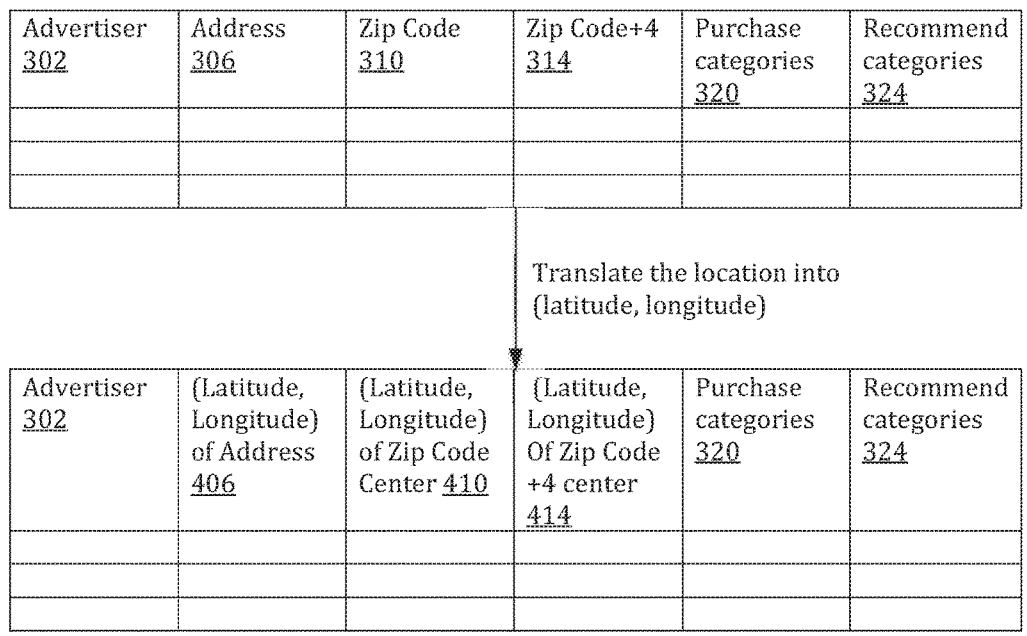
FIGURE 4. Geo Lookup Module Processed Data

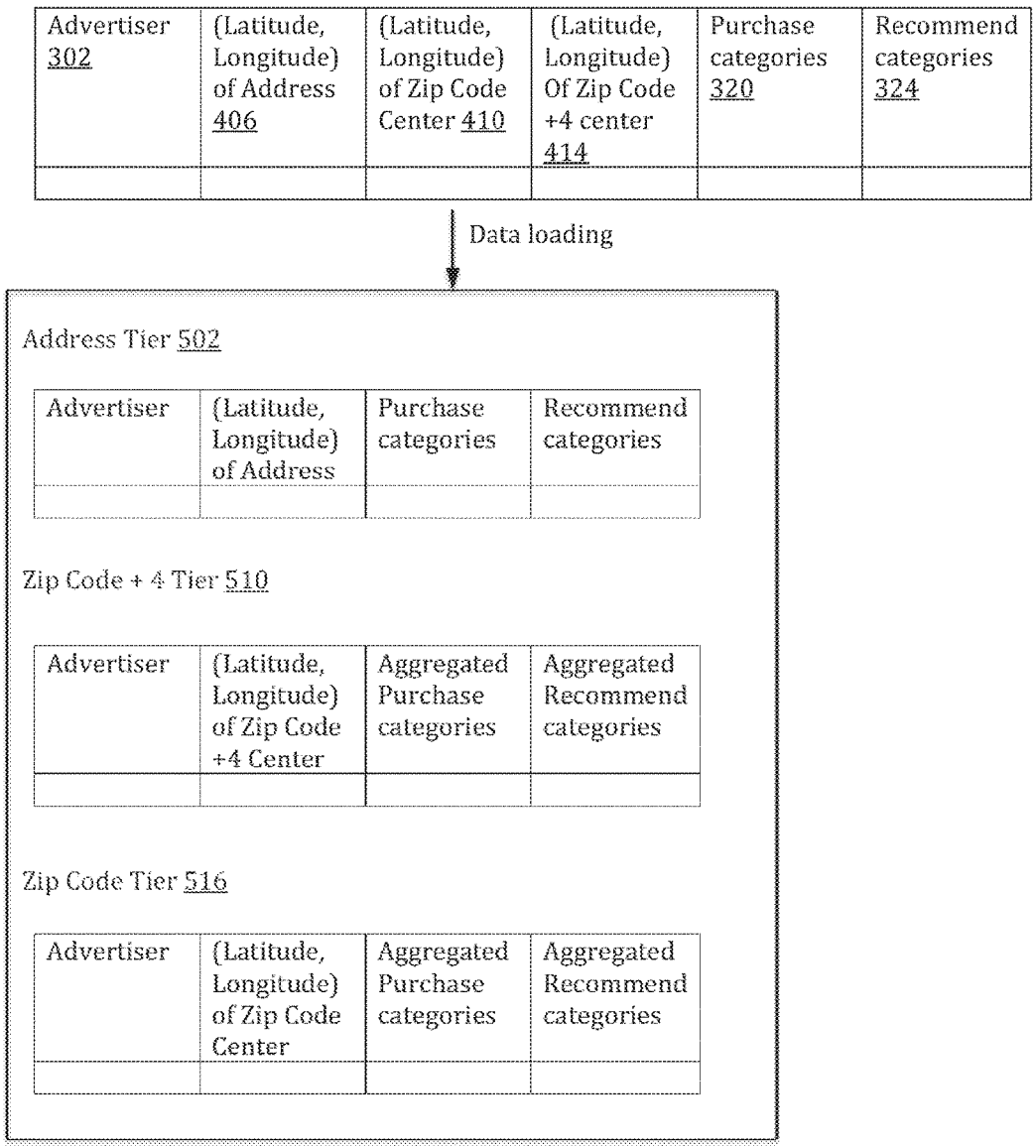
FIGURE 5. Data Loading Module Processing

LOCATION RETARGETING SYSTEM FOR ONLINE ADVERTISING

PRIORITY CLAIM

This application claims priority to and is a continuation of U.S. application Ser. No. 13/951,091, filed on Jul. 25, 2013, entitled "LOCATION RETARGETING SYSTEM FOR ONLINE ADVERTISING", which claims the benefit of U.S. Provisional Patent Application No. 61/676,895, filed on Jul. 28, 2012, both of which are incorporated by reference herein in their entirety.

TECHNICAL FIELD

The present description relates generally to a system and method for online advertising, and more particularly to a mobile advertisement retargeting system and method.

BACKGROUND

Advertisement retargeting is related to online advertising, and in particular, behavioral retargeting and CRM (customer relationship management) retargeting. Behavioral retargeting, also referred to as behavioral remarketing or retargeting, and CRM retargeting, are forms of online targeted advertising where online advertising is directed or targeted to consumers based on their previous Internet or offline activity.

Behavioral retargeting and CRM retargeting use accumulated data or prior knowledge of a user or customer, typically accessible through a CRM system or similar database. In retargeting systems, advertisers use offline CRM system information, such as purchase history and search history, to optimize their online advertising.

Known retargeting systems depend on the consumers' web browser cookie to identify them. The consumers' previous online and offline activities are keyed by the web browser cookie. The user has the option to disable the cookie on a personal computer, thus is essentially in control of his or her own privacy requirements. However, the web browser on most mobile devices does not support third party cookies, and most mobile device applications do not support cookies as well. Without a stable cookie, advertisers cannot identify a consumer and deliver targeted advertising to a mobile device.

Because of the widespread adoption of mobile device, such as smart phones and tablets, consumers spend more and more time on mobile devices. Different technologies exist to uniquely identify a user's mobile device, such as device fingerprinting, device unique identification, MAC address-based identification (media access control address), identification based on the MSID (mobile station ID) of the mobile phone, and the like. However, such unique mobile device identification techniques raises significant consumer privacy concerns, and may run contrary to legal regulations, especially because the user of most mobile devices, cannot disable transmission and interception of the MSID and the like.

Mobile devices, such as smart phones and tablets, have become a significant media consumption point for consumers, and many applications on such mobile devices are configured to provide accurate user location, such as latitude and longitude based on GPS systems built into the mobile device. Because of the privacy and legal issues mentioned above, it is desirable to provide an advertisement system and method based on a user's location information to deliver targeted advertising to customers and/or potential customers, without identifying or pinpointing the user based on sensitive private information.

SUMMARY

A system for retargeting customers is based on a mobile device query initiated by a user, and includes a query module configured to receive a query with geographical information from the mobile device of the user, and configured to determine geographical identifiers of the mobile device. An indexed database is configured to store an aggregated plurality of customers having a geographical identifier proximate to the determined geographical area, and a processor selects an advertiser located proximate to the determined geographical area. A performance feedback module is configured to assign an effectiveness rating to one or more advertisements provided by the selected advertiser based on marketing attributes of the aggregated plurality of customers. An advertisement recommendation module then recommends one or more advertisements provided by the selected advertiser based on the assigned effectiveness rating, and the aggregated plurality of customers are retargeted by transmitting the recommended advertisements to one or more customers of the aggregated plurality of customers.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 3 is an illustration of one embodiment of data in a database.

FIG. 4 is an illustration of one embodiment of data in a database augmented with latitude and longitude data.

FIG. 5 is an illustration of one embodiment showing data arranged according to location granularity.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Accordingly, the invention is not to be restricted except in light of the attached claims and their equivalents.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
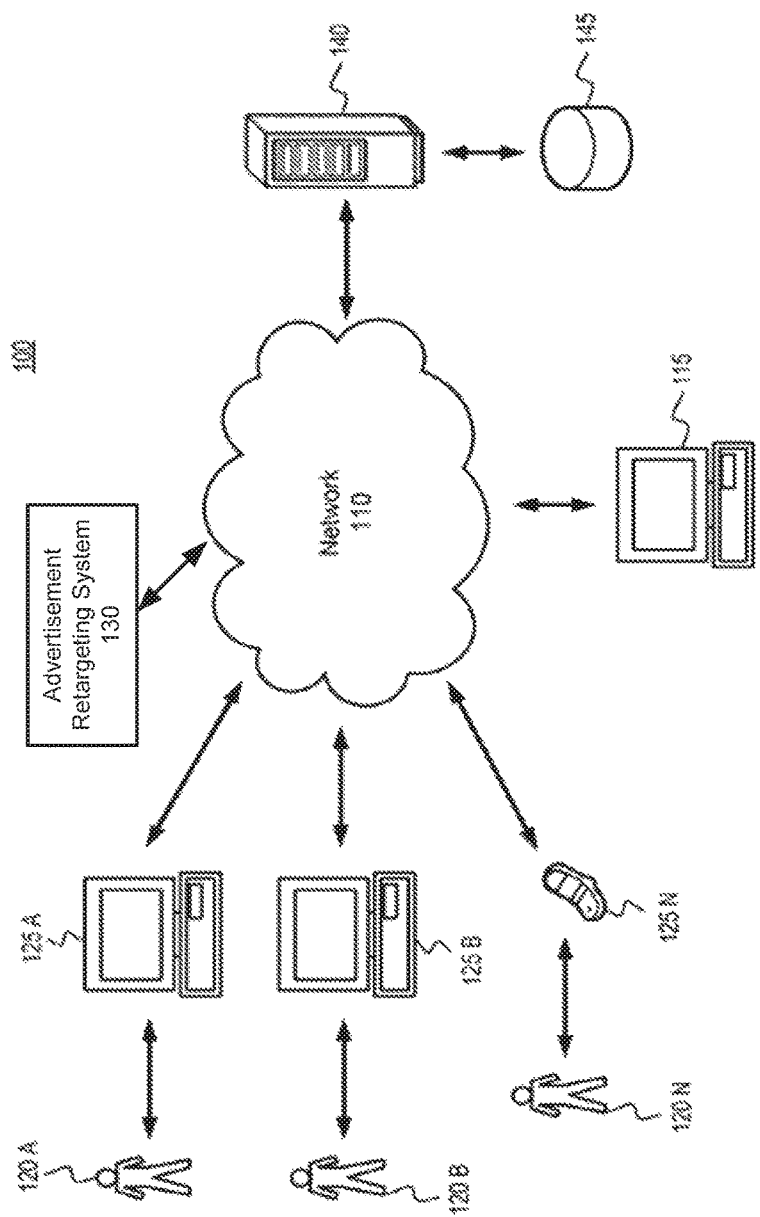
FIG. 1 is a block diagram of a network environment in which the advertising retargeting system operates.

FIG. 1 is a schematic diagram illustrating an example embodiment of a simplified network environment 100. Other embodiments that may vary, for example, in terms of arrangement or in terms of type of components, are also intended to be included within claimed subject matter. The network environment 100 may include, for example, a variety of communication networks 110, such as the Internet, a local area local area network (LAN), wide area network (WAN), a wireless network, and the like.

The network environment 100 may include one or more content providers 115. Content providers 115 may generate, create, provide, and/or sponsor content, such as web pages, websites, information, data, or other electronic content to one or more users 120A-120N, some of whom may access the network 110 using mobile devices, such as smart phones, tables, PDA's (personal digital assistants), or other wireless device 125N. Examples of content may include text, images, audio, video, or the like, which may be processed in the form of physical signals, such as electrical signals, for example, or may be stored in memory, as physical states, for example. An advertising retargeting system 130 may be operatively coupled to the network 110.

The users 120A-120N coupled to the network 110 may interact with the content provider 115. Users 120A-120N may be people, businesses, machines, content providers 115, the advertising retargeting system 130, or entities and applications, which may connect and interact with each other through the network 110. Users 120A-120N may connect with content providers 115 and/or other users over the network 110 using one or more of a web application 125A, a standalone application 115 or 125B, or a mobile application 125N or mobile client device. Each of the web applications, standalone applications, and mobile applications 125A-125N may individually be referred to as a client application or client device, or a user application or user device. Preferably, the mobile applications or mobile client device 125N is contacted by or communicates with the advertising retargeting system 130.

Not all of the depicted components in FIG. 1 may be in every system, however, and some implementations may include additional components not shown in the figures. Variations in the arrangement and type of the components may be made without departing from the spirit or scope of the claims as set forth herein.

The mobile client device or mobile application 125N may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The mobile client device or mobile application 125N may include a computing device capable of sending or receiving signals, such as via a wired or a wireless network. The users and/or client devices 120A-120N, may for example, include a desktop computer or a portable device (125N), such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Figure 2:
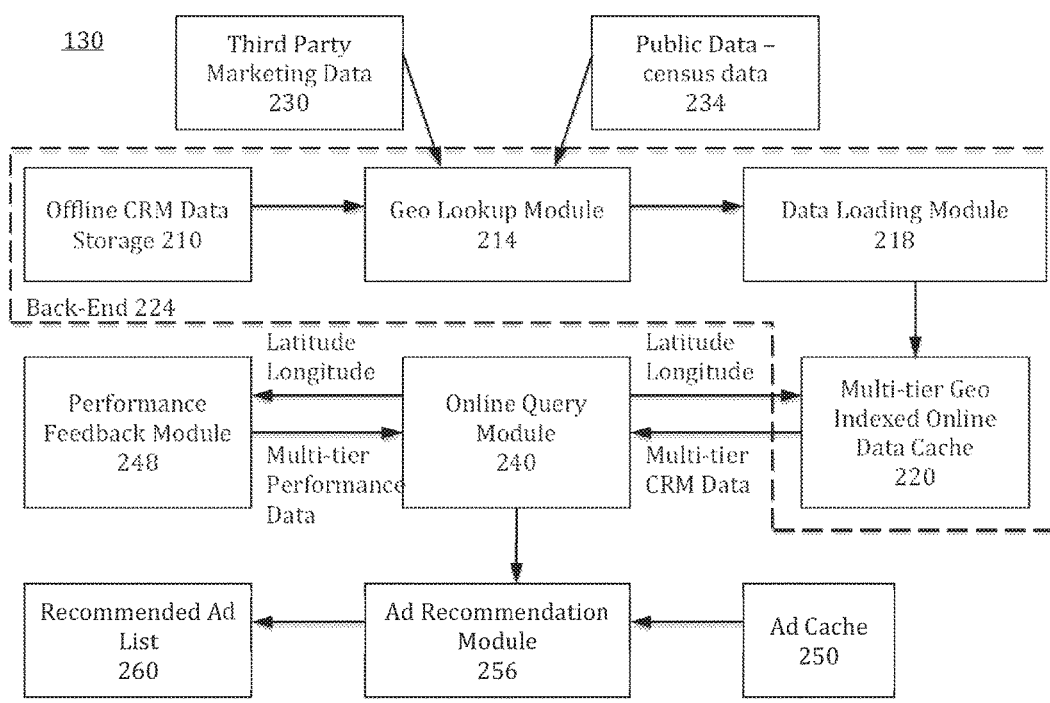
FIG. 2 is a block diagram of one embodiment of the advertising retargeting system.

Referring now to FIG. 2, the advertising retargeting system 130 is shown in greater detail in block diagram format. The advertising retargeting system 130 includes an offline CRM data storage 210, a geo-lookup module 214, a data loading module 218, and a multi-tier geo-indexed online data cache 220, which together form a back end data service 224 of the advertising retargeting system 130.

In some embodiments, various data sources, such as third party marketing data 230 (data from various advertisers), publicly available data 234 such as US census data, and data from other data sources and databases, may populate the offline CRM database 210 with data, which data may be provided to the geo-lookup module 214.

In some embodiments, the offline CRM database 210 is referred to as "offline" because it is preferably populated during "backend" processing and is not necessarily accessed in a dynamic fashion by the advertising retargeting system 130. Conversely, in some embodiments, the multi-tier geo-indexed online data cache or database 220 is referred to as "online" because it is preferably accessed during "front-end" or real-time dynamic processing by the advertising retargeting system 130.

Additional modules or components of the advertising retargeting system 130 may include an online query module 240, a performance feedback module 248, an advertisement cache 250, an advertisement recommendation module 256, and a recommended advertisement list 260. The above-described processing modules may be implemented in hardware, or may be implemented using a combination of hardware and software.

As an initial step, the offline CRM data storage 210 may be populated or pre-populated with data. In some embodiments, the CRM data storage 210 may be physically or logically segregated according to the different advertisers who use, access, and/or provide proprietary customer data, so as to ensure the privacy of the customer information and the proprietary nature of various advertisers' customer-base information. The CRM data storage 210 may be populated with an advertiser's own proprietary CRM data, data from third party marketing data 230, and/or data from publicly available data 234, such as US census data and or other public information, as discussed above.

Thus, the offline CRM data storage 210 may be populated with data provided by a particular advertiser as well as data from other sources. The advertiser may maintain its own customer database or may have purchased data from other database facilities. The advertiser may then provide its cumulative data to the CRM data storage 210 for use in retargeting some of the advertisements. The data contributed by the particular advertiser may include specific data with respect to a customer, such as name, address, zip code, telephone number, purchase history, search history, marketing data, and the like.

It is important to note, however, that at no point is the user who makes the query using a mobile device positively identified, regardless of whether the user is or is not listed in the CRM Data Storage 210. Rather, the identity of such a user making the query from a mobile device is maintained in private.

Once the CRM offline data storage 210 has been populated with data, either initially or as an ongoing updating process, the data is geo-tagged. Unlike known retargeting system, the input data in the CRM offline data storage 210 is not keyed or indexed by cookie-type identification or any other identifier that uniquely identifies the user making the query using a mobile device. This avoids raising privacy or legal issues because the sensitive data corresponding to a user, such as age, gender, and income level, which may be in the CRM offline data storage, is not correlated with or attributed to the user making the query.

Instead, the geo-lookup module 214 converts or augments each applicable data field in the CRM offline data storage 210 that inherently provides location related information, into a corresponding latitude and longitude and stores the data (via the data loading module 218) into the geo-indexed online data cache 220. Thus, after processing by the geo-lookup module 214, each data row in the geo-indexed online data cache 220 will be keyed by latitude and longitude.

FIG. 3 shows a simplified example of an advertiser's data entry before conversion by the geo-lookup module 214, which may be provided to the CRM offline data storage 210 by the advertiser or vendor. Each row of data may contain a plurality of data fields with respect to the customer or user, and also includes the identity of the advertiser (or business entity). As described above, the information regarding the user or customer may have been accumulated and provided by the vendor or business entity, such as an on-line business, a "brick and mortar" store, or any commercial establishment with whom the user or customer has had dealings, and has supplied such data to the commercial establishment.

Such data fields may include, for example, an identity of the advertiser 302, an address of the user 306, a zip code of the user 310, an extended zip code 314 of the user, and preferably also contains other information with respect to the user's prior history, such as purchases 320 of products and services made by the user, recommendations of product categories 324, and other marketing information generally. Note, as used herein, the customer or user refers to the person making a query using a mobile device.

Clearly, the address field 306, the zip code field 310, and the extended the zip code field 314 inherently contain location information regarding the customer. Each of these three fields contain inherent location information with different granularity. In that regard, the address field 306 contains of the most precise location information, while the extended the zip code field 314 provides the next level of location granularity. The non-extended or normal zip code field 310 provides the lowest resolution or granularity, as the area covered by the normal zip code field 310 covers the largest geographical area, in most instances.

FIG. 4 shows an example of the data fields in the geo-indexed online data cache 220 after processing by the geo-lookup module 214 and data loading module 218. For each applicable field, namely, the address 306, the zip code 310, and the extended the zip code 314, the geo-lookup module 214 converts or augments each field with the corresponding latitude and longitude or a plurality of corresponding latitude and longitude values that define or form a border about the corresponding field. Any suitable representation of geographical area may be used. For example, if the boundary defining a particular zip code field is circular, one representation may be a center point in terms of a latitude and longitude value, and a corresponding radius. If the boundary defining a particular zip code field is square, perhaps four values of longitude and latitude can accurately define the zip code area. Alternatively, an irregularly shaped zip code boundary may require additional latitude and longitude values to accurately define the zip code area.

Preferably, for reasons of data efficiency, a center point corresponding to the latitude and longitude may be implemented, and further in some embodiments, the radius may not necessarily form part of the latitude and longitude identification, but rather, the radius may be variable so that it may be changed in accordance with the application and desired degree of "inclusiveness," or based upon the customer "density" of a particular geographical area.

As shown in FIG. 4, each field having inherent location information (address 306, zip code 310, and extended zip code 314) is augmented or converted by the geo-lookup module 214 to include the latitude and longitude information, as shown by an address field with latitude and longitude 406, a zip code field with latitude and longitude 410, and an extended zip code field with latitude and longitude 413. The latitude and longitude values may represent a proximate value or location relative to the physical area represented by the data field, and such a proximate value may be predetermined and may change depending upon the application.

As shown in FIG. 5, the data loading module 218 may process the geo-indexed online data cache 220 data entries, which were modified by the geo-lookup module 214, into a multi-tiered format. The data in the multi-tiered format represents geographical areas of decreasing precision or granularity, with an address tier 502 having the greatest precision, the extended zip code tier 510 having the next level of precision, and the zip code tier 516 having the lowest level of precision, meaning it most likely encompasses the greatest geographical area.

The data loading module 220 may initially divide each input row of data into multiple rows or entries according to the different types of location-based fields. For example, if an input row of data includes the address field 406, the extended zip code field 414, the zip code field 410, and other attributes 320, 324, the data loading module 218 may convert the row of data into three rows, with a first row 502 keyed by the latitude and longitude corresponding to the address field 406 plus other attributes, the second row 510 keyed by the latitude and longitude corresponding to the extended zip code field 414 plus other attributes, and the third row 516 keyed by the latitude and longitude of the zip code field 410 plus the other attributes. The data loading module 218 may insert the above-described tier-based data into the multi-tier geo-indexed online data cache 220 for rapid access by the advertisement retargeting system 130.

In some embodiments, for each generated row, the data loading module 218 may lookup existing data from multi-tier online data cache by using latitude and longitude as key or index into the data. If data is found in the multi-tier geo-indexed online data cache 220, various attributes may be integrated with existing data according to predetermined data integration rules. If data is not found in the multi-tier geo-indexed online data cache 220, new data may be inserted into the multi-tier geo-indexed online data cache 220.

In some embodiments, the multi-tier geo-indexed online data cache 220 may be a distributed data cache configured to receive input data corresponding to the advertiser based on location of the advertiser, along with customers having a related geographical area. The data in the multi-tier geo-indexed online data cache 220 may be accesses by a desired assigned latitude and longitude. Each record preferably includes a flag or other indication to indicate the resolution or granularity of the data. All data that belongs to the same tier or level of granularity may be placed into or defined by a single data structure, such as a B-Tree or other suitable data structure.

Given a latitude and longitude for a particular input, the multi-tier geo-indexed online data cache 220 may be accessed to lookup closest data for all resolution levels. The output from the multi-tier geo-indexed online data cache 220 may include data based on the address level 502, the extended zip code level 510, and/or the zip code level 516. Additional fields or levels may be derived from these fields, such as state, city, county and the like. Data can be distributed to multiple servers, and distance/location based partitions may be used to partition the data to corresponding servers located in different states. For example, a first server may contain the indexed data corresponding to the western US states based on zip code information, while a plurality of other servers may contain indexed data corresponding to other regions or groups of states throughout the country. This increases processing efficiency and response time. The above has described with respect to the back-end operation necessary to accumulate and organize the data.

In operation, when a user on a mobile device performs a query, the query is inspected and analyzed by the online query module 240. Based on the latitude and longitude associated with the query, the online query module 240 may look up customer data resident in the multi-tier geo indexed online data cache 220, which as mentioned above, may be distributed among multiple servers. The online query module 240 may access the appropriate distributed server that contains the customer data corresponding to the determined latitude and longitude of the mobile query.

Because the multi-tier geo-indexed online data cache 220 may contain varying levels of resolution, an advertiser may be able to accurately target a specific geographical area and reach potential customers in that area. Also, assuming that the multi-tier geo-indexed online data cache 220 has been populated with attribute data previously provided to the CRM database 210 with respect to the users purchases and search history, the advertising retargeting 130 can refine and select relevant advertisement for retargeting, where such customers may be within a particular predetermined radius of, or proximate to, the user placing the instant query.

Based upon the determined latitude and longitude of the user's query using the mobile device, the online query module 240 may also communicate with the performance module feedback module 248. The performance module feedback module 248 may recommend a particular advertiser and associated advertisements based on the geo-location of the user's query using the mobile device. For example, if an advertiser has a store that is in or near the location associated with the user's query, that advertiser may be selected such that one (or more) of their advertisements may be selected for retargeting. If multiple advertisers exist within the geographical location of the user's query, more than one advertiser may be selected and processed in sequence.

The performance feedback module 248 may analyze the effectiveness of various advertisements for the selected advertiser in a particular location based on the location of the user's query using the mobile device, and provide a rating of such advertising effectiveness to the online query module 310. For example, if the selected advertiser has a high click-through rate for certain advertisements in the selected geographical area, such advertisements may recommended for retargeting by the performance feedback module 248. In other words, advertisements having a high conversion rate for a particular advertiser may be recommended for retargeting. Other advertisements for the selected advertiser may not be recommended if the conversion rate or other criteria indicates that such advertisements are not particularly effective in the geographical area of interest.

For example, the performance module feedback module 248 may recommend an advertiser, such as Home Depot, and an associated advertisement for power tools from Home Depot if it is determined that the conversion rate for a majority or predetermined number of potential customers in the targeted geographical area for that type of advertisement is higher than a predetermined threshold, and indicated by the attributes, such as purchase categories 320 and recommended categories 324 originally provided by the offline CRM data storage 210.

The online query module 240 may then provide the data to the advertisement recommendation module 256, including the recommendation of potential advertisers and corresponding advertisements for retargeting from the performance feedback module 248. The advertisement recommendation module 256 uses the input data to rank all advertisements and stores all ranked advertisements in the advertisement cache 250.

The advertisement recommendation module 256 may iteratively process all the ads in the advertisement cache 250 and rank each advertisement according to its targeting criteria and available data. The advertisement recommendation module 256 may utilize machine learning algorithms, statistic modeling, and/or optimization processing techniques to blend the advertiser's multi-tier CRM data and multi-tier advertising performance data with advertising targeting data. All ads will be ranked and will be output to the recommended advertisement list 260 by the advertisement recommendation module 256.

Note that once an advertisement for a particular advertiser has been selected for retargeting, the advertisement is preferably sent to the plurality of potential customers listed in the geo-indexed online data cache 220 who are all within a predetermined geographical area or radius based on the determined location of the user who has made a query using a mobile device. Note that if the user making the query happens not to be in the offline CRM database 210 at all, that user may not necessarily receive the retargeted advertisement, although the plurality of other potential customers who have been aggregated geographically, will receive the retargeted advertisement.

Figure 6:
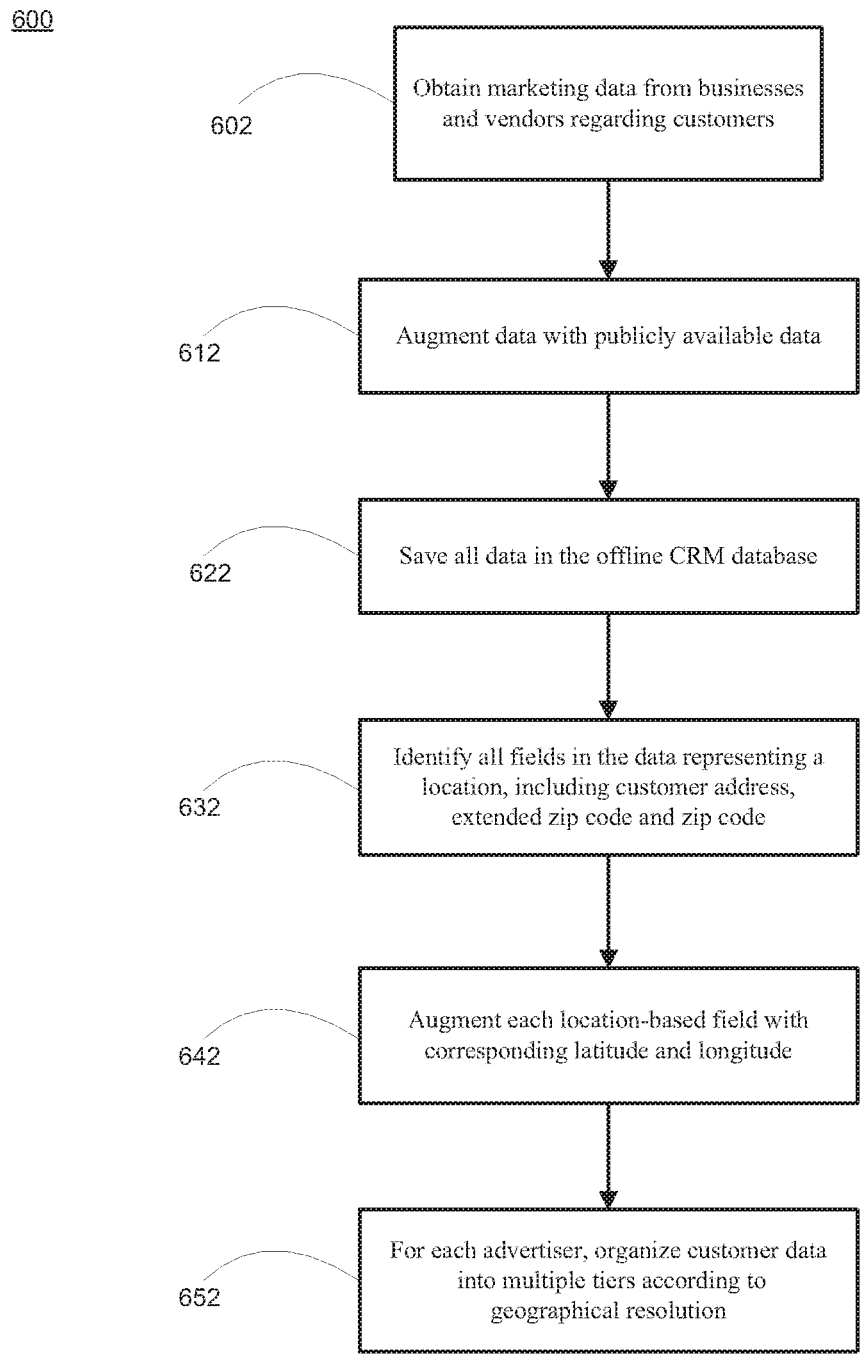
FIG. 6 is a flowchart showing back-end processing according to one embodiment.

FIG. 6 is a flowchart 600 showing back-end processing to build the offline CRM data storage 210. Initially, to build of the offline CRM data storage 210, marketing data from businesses and vendors regarding their customers is obtained (602). The data may then be supplemented with publicly available data, which may further assist in providing location-based information (612). Once all the data has been accumulated, it may be saved in the offline CRM database (622). In some embodiments, each data entry or record may be represented as a line or row of data having multiple fields.

Any suitable database format may be used. Next, each field in the entry or record is inspected to determine if it may represent a physical location (632), where such location-based fields may include customer address, customer extended zip code, and customer zip code. For each field that is determined to be location-based, the corresponding latitude and longitude values are computed (or looked up) and are added to the data entry or record (642).

Note that the latitude and longitude values may replace the existing location-based field, or may be added so that both the original data and the corresponding latitude and longitude remain in the field. The data is then organized into multiple tiers (652) for each advertiser with respect to the customer information. Such tiers may be based on three levels of resolution with respect to the latitude and longitude associated with the customer address, the customer extended zip code, and the customer zip code, respectively. Note that the above process may be an ongoing process such that the offline CRM database and geo-indexed online data cache 220 may be continuously updated as new information is received or uncovered.

Figure 7:
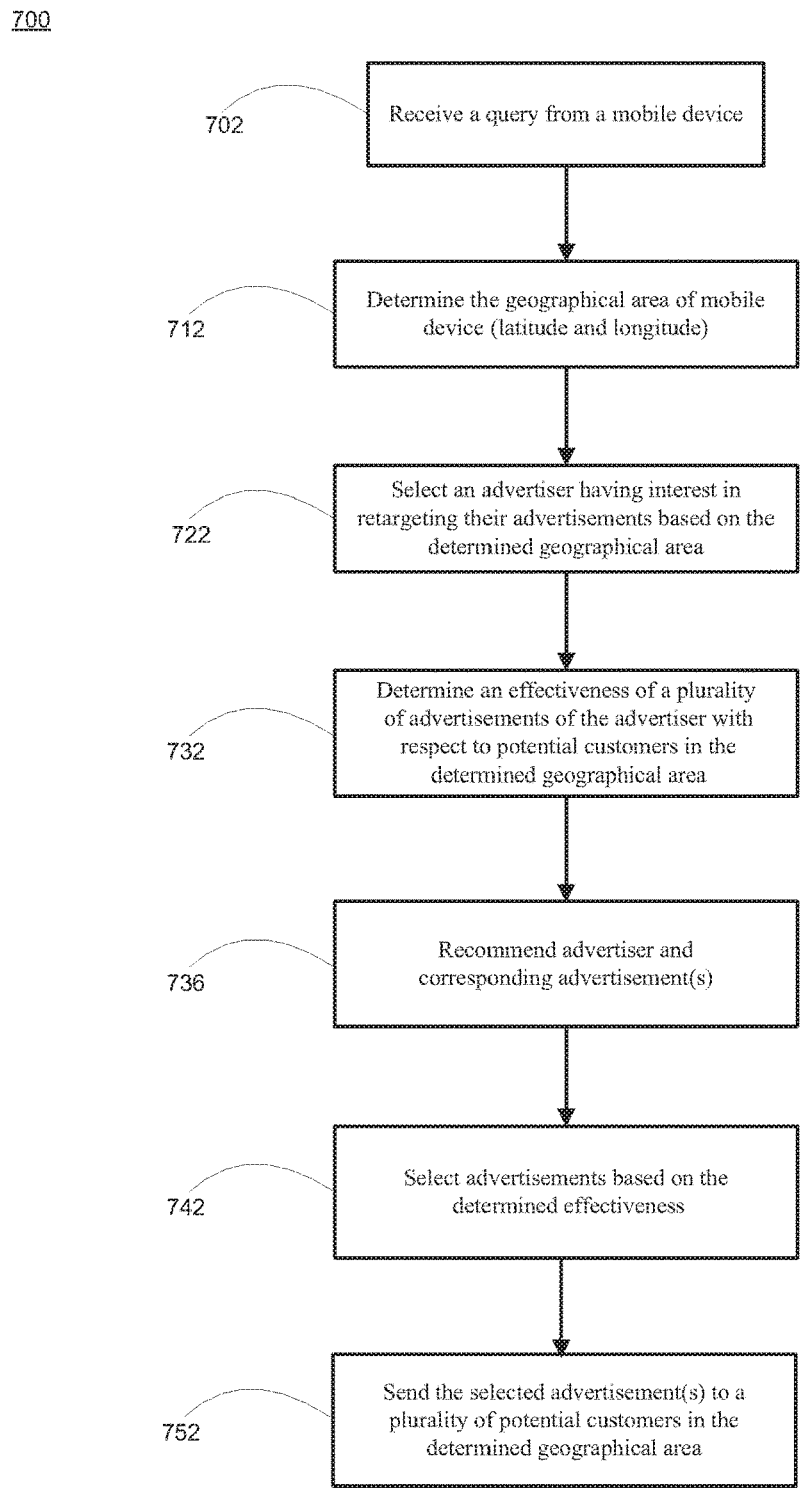
FIG. 7 is a flowchart showing foreground processing according to one embodiment.

FIG. 7 is a flowchart 700 showing the front-end processing once the offline CRM data storage 210 has been build and the geo-indexed online data cache 220 have been generated. Initially, a browser-based query is received from a user's mobile device (702). Based on the geo-coordinates provided by the query associated with the query, the corresponding latitude and longitude of the query is saved (712). Next, a specific advertiser who wishes to participate in the retargeting program using the advertising retargeting system 130 is selected so that certain advertisements from that selected advertiser can selected for retargeting (722). The advertiser may be selected based on the determined geographical coordinates of the user's query using the mobile device. As one example, the advertiser may have a commercial establishment in the vicinity of the determined geographical location associated with the query, and thus may be selected.

Next, an indexed online data cache containing corresponding potential customers for that advertiser is inspected. As set forth above, the indexed online data cache is based on data initially residing in the offline CRM data storage 210, and is organized into multiple tiers or levels, which levels are keyed or indexed to the corresponding latitude and longitude of those potential customers. Because the data also contains attributes for each of those potential customers, including for example, searching and purchasing history, various online history, such as prior queries, click-through history, and the like, a search of the attributes of the potential customers in the selected geographical area with respect to a particular advertisement may provide an indication of the conversion rate or effectiveness of the various advertisements (732).

Based on the determined effectiveness of certain advertisements for the selected advertiser, one or more advertisements are recommended for retargeting (736). Next, an advertiser and one or more corresponding advertisements are selected based on the determined effectiveness (742). The various selected or recommended effective advertisements are placed in an advertising cache and are sent or retargeted to the plurality of potential customers in the selected geographical area (752).

Note that in FIG. 1, the content provider 115 may include, and/or be operable to use or access the content server 140 or search server, which may be indirectly coupled to the content provider 115 through the network 110, or may be directly coupled to the content provided 115. The content server 140 may include a device that includes a configuration to provide content via a network to another device. The content server 140 may, for example, host a site, such as a social networking site, examples of which may include, without limitation, Flicker, Twitter, Facebook, LinkedIn, or a personal user site (such as a blog, vlog, online dating site, etc.). The content server 140 may also or alternatively host a variety of other sites, including, but not limited to business sites, educational sites, dictionary sites, encyclopedia sites, wikis, financial sites, government sites, etc. The content server 140 may be operatively coupled to the storage device or database 145, which may be, or include distributed storage devices.

The content server 140 may provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of devices that may operate as a content server include desktop computers, multiprocessor systems, microprocessor-type or programmable consumer electronics. Other examples are possible.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The various client devices and/or client applications 120A-120N, and 125N may include or may execute a variety of operating systems, including a personal computer operating system, such as a Windows, iOS or Linux, or a mobile operating system, such as iOS, Android, or Windows Mobile, or the like. Such client devices and or applications may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The client devices and/or client applications 120A-120N, and 125N may also include or execute an application to communicate content, such as, for example, textual content, multimedia content, or the like. The client devices and/or client applications 120A-120N, and 125N A may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

With respect to FIG. 1, the network 110 may also include other mass storage in addition to the storage device or database 145, such as network attached storage (NAS), a storage area network (SAN), or other forms of computer or machine readable media, for example. The network 110 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs The network 110, which is a communication link or channel, may include for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The network 110 may include wired or wireless networks. A wireless network may couple client devices with a network. A wireless network may employ stand-alone ad-hoc networks, mesh networks, Wireless LAN (WLAN) networks, cellular networks, an 802.11, 802.16, 802.20, or WiMax network. Further, the network 110 may be a public network, such as the Internet, a private network, such as an intranet, or combinations thereof, and may utilize a variety of networking protocols now available or later developed including, but not limited to TCP/IP based networking protocols.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Many communication networks send and receive signal packets communicated via the various networks and subnetworks, and form a participating digital communication network, and which may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network 110 may be or include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The network 110 may be or include a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

The network 110 may be or include a social network. The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or subnetworks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The network environment 100 may be configured or operable for multi-modal communication which may occur between members of a social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, SMS/MMS, email, instant messenger clients, forums, social networking sites (such as Facebook, Twitter, or Google+), or the like.

A search engine may enable a device, such as a client device, to search for files of interest using a search query. Typically, a search engine may be accessed by a client device via one or more servers. A search engine may, for example, in one illustrative embodiment, comprise a crawler component, an indexer component, an index storage component, a search component, a ranking component, a cache, a profile storage component, a logon component, a profile builder, and one or more application program interfaces (APIs). A search engine may be deployed in a distributed manner, such as via a set of distributed servers, for example. Components may be duplicated within a network, such as for redundancy or better access.

A crawler may be operable to communicate with a variety of content servers, typically via network. In some embodiments, a crawler starts with a list of URLs to visit, which may be referred to as a seed list. As the crawler visits the URLs in the seed list, it may identify some or all the hyperlinks in the page and add them to a list of URLs to visit, which may be referred to as a crawl frontier. URLs from the crawler frontier may be recursively visited according to a set of policies. A crawler typically retrieves files by generating a copy for storage, such as local cache storage. A cache may refer to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight, in one example embodiment may be assigned substantially in accordance with a difference between the number of records indexed without the index entry and the number of records indexed with the index entry.

The term "Boolean search engine" refers to a search engine capable of parsing Boolean-style syntax, such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., science of meaning in language) to search repositories of various types of content.

Search results located during a search of an index performed in response to a search query submission may typically be ranked. An index may include entries with an index entry assigned a value referred to as a weight. A search query may comprise search query terms, wherein a query term may correspond to an index entry. In an embodiment, search results may be ranked by scoring located files or records, for example, such as in accordance with number of times a query term occurs weighed in accordance with a weight assigned to an index entry corresponding to the query term. Other aspects may also affect ranking, such as, for example, proximity of query terms within a located record or file, or semantic usage, for example. A score and an identifier for a located record or file, for example, may be stored in a respective entry of a ranking list. A list of search results may be ranked in accordance with scores, which may, for example, be provided in response to a search query. In some embodiments, machine-learned ranking (MLR) models are used to rank search results. MLR is a type of supervised or semi-supervised machine learning problem with the goal to automatically construct a ranking model from training data.

In one embodiment, as an individual interacts with a software application, e.g., an instant messenger or electronic mail application, descriptive content, such in the form of signals or stored physical states within memory, such as, for example, an email address, instant messenger identifier, phone number, postal address, message content, date, time, etc., may be identified. Descriptive content may be stored, typically along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A profile builder may initiate generation of a profile, such for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example. A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

Advertising may include sponsored search advertising, non-sponsored search advertising, guaranteed and non-guaranteed delivery advertising, ad networks/exchanges, ad targeting, ad serving, and/or ad analytics. Various monetization techniques or models may be used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

An "ad server" comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

While the computer-readable medium as described or set forth in the appended claim may be described as a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

Note that dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system, comprising:
   a processor; and
   memory comprising instructions that when executed by the processor implement:
      a geo-indexed cache of at least two tiers, entries of the geo-indexed cache storing information about multiple potential customers, each entry in the geo-indexed cache comprising a key based on latitude and longitude values, each respective tier of the at least two tiers corresponding to a respective geographic area having a respective geographic resolution among a range of geographic resolutions to permit a range of precision in geographic targeting in the respective geographic area;
      a query module configured to receive geo-location information from a mobile device of a user, perform a lookup in the geo-indexed cache using the geo-location information and a desired respective geographic resolution to identify a tier of the at least two tiers, and determine location data for the mobile device of the user; and
      an ad recommendation module configured to:
         control transmission of advertisements based on the location data for the mobile device of the user and an advertiser retargeting criterion, the ad recommendation module communicating data defining the advertisements to the user and a plurality of potential customers selected from the geo-indexed cache using the location data, the plurality of potential customers being located in a predetermined area or radius defined by the location data.

2. The system of claim 1, wherein a value corresponding to each key in the geo-indexed cache comprises customer information from an indexed database.

3. The system of claim 1, wherein each of the at least two tiers of the geo-indexed cache comprises a single data structure.

4. The system of claim 1, wherein the geo-indexed cache comprises one or more tiers comprising at least one of a first tier corresponding to an address, a second tier corresponding to an extended zip code, or a third tier corresponding to a zip code.

5. The system of claim 1, wherein the latitude and longitude values are associated with at least one of census data or third-party data.

6. The system of claim 1, wherein the latitude and longitude values are associated with at least one of data search history data or purchase history data.

7. The system of claim 1, further comprising a data loading module circuit configured to perform indexing for the geo-indexed cache.

8. The system of claim 1, further comprising a performance feedback module circuit comprising performance data for at least two locations.

9. The system of claim 1, wherein the system is distributed across multiple servers using a range-based partition.

10. A method, comprising:
    caching advertiser data into at least two tiers of cached advertiser data, each respective tier of the at least two tiers having a respective geographical resolution among a range of geographical resolutions to permit a range of precision in geographic targeting in respective areas defined by respective tiers of the at least two tiers, with keys based on latitude and longitude values, the cached advertiser data including a plurality of entries storing information about multiple potential customers;
    receiving geo-location information from a mobile device of a user;
    performing a query of at least one tier of the at least two tiers of the cached advertiser data using the geo-location information, the at least one tier being defined by a desired geographical resolution;
    determining one or more advertisements based on results of the query; and sending the one or more advertisements to the user and to a plurality of potential customers selected from the multiple potential customers with information using the geo-location information for the mobile device of the user, the plurality of potential customers being located in a predetermined area or radius defined by location data associated with the geo-location information to deliver targeted advertisements to the user and the plurality of potential customers.

11. The method of claim 10, wherein values associated with the keys comprise customer information from an indexed database of an advertiser associated with the cached advertiser data.

12. The method of claim 10, wherein each of the at least two tiers of the cached advertiser data in memory comprises a single data structure.

13. The method of claim 10, wherein the at least two tiers comprise at least one of a first tier corresponding to an address, a second tier corresponding to an extended zip code, or a third tier corresponding to a zip code.

14. The method of claim 10, further comprising indexing a cache of at least two tiers based on advertiser proximity.

15. The method of claim 10, further comprising providing feedback regarding advertisement performance in at least two locations.

16. The method of claim 10, wherein acts of the method are performed by at least two servers.

17. A non-transitory computer-readable medium comprising instructions that, when executed by a processor, implement a system comprising:

a cache comprising latitude and longitude keys, the cache being separated into at least two tiers stored as separate data structures;

a query module configured to receive geo-location information from a mobile device of a user, perform a lookup in the cache using the geo-location information and a desired geographic precision to select a tier among the at least two tiers and determine location data for the mobile device of the user; and an ad recommendation module configured to:

control transmission of advertisements based on the location data for the mobile device of the user and an advertiser retargeting criterion related to at least one of customer search history or purchase history and a tier of the at least two tiers so that recommended advertisements are sent to the user and to a plurality of potential customers located in a predetermined area or radius defined by the location data for the mobile device of the user, wherein the controlling transmission comprises using the location data to deliver targeted advertisements to the user and the plurality of potential customers.

18. The non-transitory computer-readable medium of claim 17, wherein at least one of the at least two tiers comprises keys based on a translation of an extended zip code for a customer.

* * * * *